N. Potter,
Animal Power.
No. 112,179. Patented Feb. 28. 1871.

Witnesses:
R. C. Dietrich.
Wm. H. C. Smith.

Inventor:
N. Potter.
per Munn & Co
Attorneys.

UNITED STATES PATENT OFFICE.

NICHOLAS POTTER, OF EAST TROY, PENNSYLVANIA.

Letters Patent No. 112,179, dated February 28, 1871.

IMPROVEMENT IN ADJUSTABLE ANIMAL-POWERS.

The Schedule referred to in these Letters Patent and making part of the same.

*To all whom it may concern:*

Be it known that I, NICHOLAS POTTER, of East Troy, in the county of Bradford and State of Pennsylvania, have invented a new and useful Improvement in Adjustable Animal-Power; and I do hereby declare that the following is a full, clear, and exact description thereof, which will enable others skilled in the art to make and use the same, reference being had to the accompanying drawing forming part of this specification, in which—

Similar letters of reference indicate corresponding parts.

Figure 1:
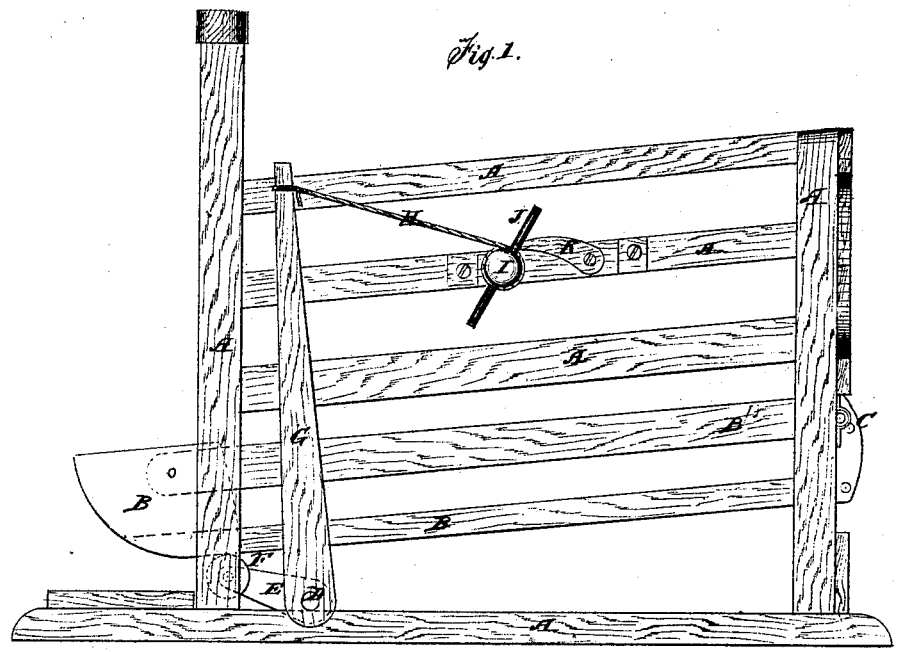
Figure 1 is a side view of my improved power.
Figure 2:
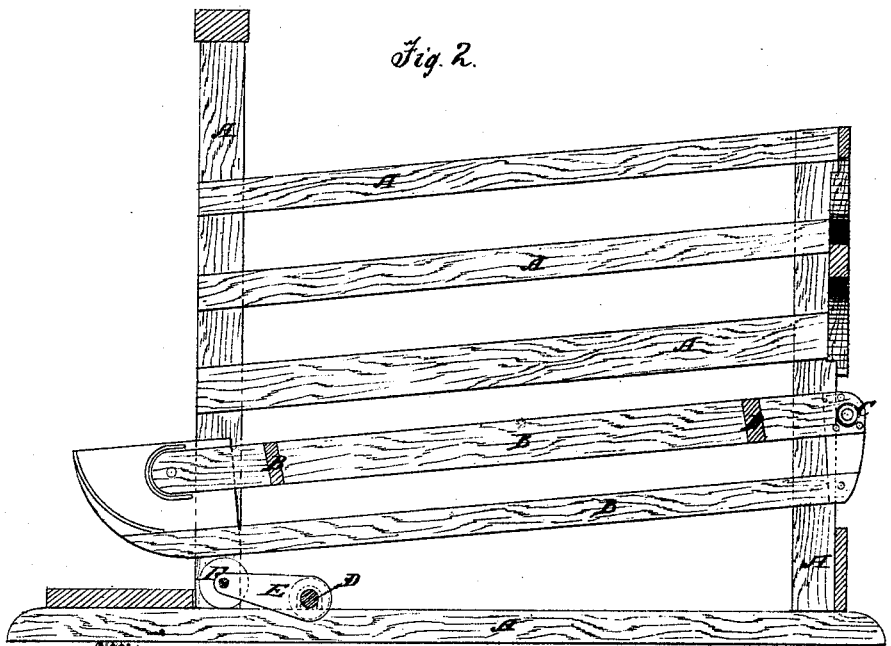
Figure 2 is a detail sectional view of the same.

My invention has for its object to furnish an improved animal-power which shall be so constructed that the inclination of the track may be increased or lessened, as may be required, without stopping the machine, removing the animal, lengthening or shortening the endless band, or affecting any of the operating parts of the machine; and It consists in the construction and combination of various parts of the machine, as hereinafter more fully described.

A is the frame of the machine, which also serves as a stall for the animal.

B is the frame that forms the track for the endless band upon which the animal walks.

C are sleeve-boxes that form the bearings for the upper or driving-roller.

The boxes C are securely attached to the end posts of the frame A, and pass through holes in the upper ends of the side bars of the track-frame B, so as to pivot or hinge the said track-frame to the main frame of the machine.

D is a shaft, pivoted to the rear part of the base-frame of the machine.

To the shaft D are rigidly attached two arms, E, having friction-rollers F pivoted to their rear ends, upon which rollers the lower parts of the side bars of the track-frame B rest, so that, by turning the shaft D, the lower end of the said frame B may be raised and lowered, to adjust its inclination of the track, as may be required.

To one end of the shaft D is rigidly attached the lower end of a long lever, G, which extends up along the side of the frame A; and to its upper end is attached one end of the rope or chain H, the other end of which is attached to a drum or pulley, I, pivoted to the side of the frame A, and provided with a crank or lever J, so that, by turning the drum or pulley I in one or the other direction, to wind the rope or chain H upon or unwind it from the said drum I, to operate the lever G, and thus adjust the inclination of the track, as required.

K is a pawl, pivoted to the frame A, the engaging end of which takes hold of ratchet-teeth formed upon or attached to the said drum or pulley I, to hold it securely in any position into which it may be turned.

Having thus described my invention,

I claim as new, and desire to secure by Letters Patent—

1. The sleeve-boxes C, in combination with the frame A, and with the track-frame B, substantially as herein shown and described, to pivot or hinge the said frame B to the said frame A, as and for the purpose set forth.

2. The combination of the shaft D, rigid arms E, friction-rollers F, long lever G, rope or chain H, drum or pulley I, crank or lever J, and pawl K, with each other and with the frame A and track-frame B, substantially as herein shown and described, and for the purposes set forth.

NICHOLAS POTTER.

Witnesses:
 FREDK. A. LONG,
 THOS. McCABE.